(12) United States Patent
Fujita et al.

(10) Patent No.: US 6,505,718 B2
(45) Date of Patent: Jan. 14, 2003

(54) VIBRATION DAMPING APPARATUS USING MAGNETIC CIRCUIT

(75) Inventors: Etsunori Fujita, Hiroshima (JP); Hiroki Oshimo, Hiroshima (JP); Hiroki Honda, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/899,623

(22) Filed: Jul. 5, 2001

(65) Prior Publication Data

US 2002/0017749 A1 Feb. 14, 2002

(30) Foreign Application Priority Data

Jul. 11, 2000 (JP) ........................................ 2000-209297

(51) Int. Cl.[7] ................................................ F16F 15/03
(52) U.S. Cl. ................... 188/267; 188/379; 267/140.14
(58) Field of Search ....................... 257/140.14, 140.15; 188/378, 379, 380, 267, 267.2

(56) References Cited

U.S. PATENT DOCUMENTS

| | | | | |
|---|---|---|---|---|
| 5,445,249 A | * | 8/1995 | Aida et al. | 188/267 |
| 5,896,961 A | * | 4/1999 | Aida et al. | 188/267 |
| 6,035,980 A | * | 3/2000 | Fujita et al. | 188/267 |
| 6,105,943 A | * | 8/2000 | Nagasawa | 267/140.14 |

FOREIGN PATENT DOCUMENTS

| | | | | |
|---|---|---|---|---|
| JP | 1210632 | * | 8/1989 | 188/267 |
| JP | 44338 | * | 1/1992 | 188/267 |

OTHER PUBLICATIONS

Etsunori Fujita, Yumi Ogura, Yutaka Sakamoto and Shigeo Honda;1997; SAE 1997 Transactions; Journal of Passenger Cars; New Vibration System Using Magneto–Spring; Section 6—vol. 106; Part 2; ppg. 2662–2633.

Etsunori Fujita, Noritoshi Nakagawa, Yumi Ogura and Shigeyuki Kojima; 1999; SAE 1999 Transactions Passenger Cars; Vibration Characteristics of Vertical Suspension Using Magneto–Spring; Section 6—vol. 108; Part 2; ppg. 2893–2908.

* cited by examiner

*Primary Examiner*—Christopher P. Schwartz
*Assistant Examiner*—Devon Kramer
(74) *Attorney, Agent, or Firm*—Steinberg & Raskin, P.C.

(57) ABSTRACT

A vibration damping apparatus using a magnetic circuit which is easier and less expensive to manufacture than conventional apparatus is provided. The apparatus comprises a moving member 30 placed to move relatively away from and close to magnets 20 and 21 and made of a magnetic material which generates attraction force between the moving member 30 and the magnets 20 and 21, metal springs 40 and 41 as elastic members urging the moving member 30 in a direction in which the moving member 30 approaches the magnets 20 and 21, and rubbers 60 and 61 as cushioning members mounted on predetermined positions to prevent the moving member 30 from coming in contact with the magnets 20 and 21. A negative spring constant is created by using an attracting magnetic circuit formed between the magnets 20 and 21 and the moving member 30, and to this, the elastic force of the metal springs 40 and 41 having a positive spring constant with the same value as the negative spring constant is added, whereby a total spring constant within a predetermined range of displacement can be set to substantially near zero by a very simple configuration.

6 Claims, 10 Drawing Sheets

ND_DAMPING APPARATUS USING
MAGNETIC CIRCUIT

BACKGROUND OF THE INVENTION

The present invention relates to a vibration damping apparatus using a magnetic circuit, and more particularly to a vibration damping apparatus using a magnetic circuit which can be used as a component in the suspension unit of a vehicle seat, an electric train seat, or a boat seat, an engine mount, or the like.

A variety of damping materials, dampers, and control techniques have been commonly used to reduce vibration and noise caused by a machine or an apparatus which itself is typically constructed of a low damping material in order to ensure its rigidity.

Damage to human body and its nervous system due to their exposures to vibration has become a serious problem with the ever increasing vehicle speed. Such damage shows many symptoms such as fatigue, headache, stiffness of shoulders, lumbago, and amblyopia. In general, vibration isolation is achieved by a damping apparatus with properly matched springs such as metal springs or air springs and damping materials such as rubber, viscoelastic materials, or dampers. However, the dynamic magnification of the damping apparatus tends to correlate to its loss factor. More particularly, a reduction in dynamic magnification to improve a low-frequency characteristic of the damping apparatus tends to reduce the loss factor, resulting in the damping apparatus being too firm and a poor damping efficiency at high-efficiency. An increase in the loss factor of the damping apparatus to improve a high-frequency characteristic leads to an increase in is dynamic magnification, resulting in the damping apparatus being too soft and a poor damping efficiency at low-frequency. Many attempts have been made in the prior art to suppress vibration by semi-active control or active control, or by using a passive damper containing a dynamic vibration damper.

A damping apparatus containing a magnetic spring device has been recently disclosed. Also, a vibration damping apparatus having a spring constant being substantially near zero by incorporating a damping member such as a metal spring and a cushioning member such a rubber material is disclosed. However, the disclosed vibration damping apparatus tends to have a high manufacturing cost and require a complicated manufacturing process. Thus, it is highly desirable to develop a novel damping apparatus which is easier to manufacture and has a spring constant being substantially near zero within a predetermined range of displacement. Such an apparatus would simplify the structure and the maintenance and reduce the size of a suspension unit, an engine mount, or the like.

SUMMARY OF THE INVENTION

The present invention is made to overcome the aforesaid disadvantage of the prior art, and its object is to provide a vibration damping apparatus using a magnetic circuit which is easier and less expensive to manufacture.

The present inventor has made investigation to solve the aforesaid problem, and found out that if a negative spring constant (elastic constant) is created by using an attracting magnetic circuit, a total spring constant (elastic constant) within a predetermined range of displacement can be set to substantially near zero by a very simple configuration by adding an elastic member having a positive spring constant (elastic constant) with the same value as the negative spring constant, leading to the accomplishment of the present invention.

To attain the aforesaid object, in accordance with one aspect of the present invention, a vibration damping apparatus using a magnetic circuit is provided. The vibration damping apparatus using the magnetic circuit comprises: a moving member placed to move relatively away from and close to a magnet and made of a magnetic material which generates an attraction force between the moving member and the magnet; an elastic member urging the moving member in a direction in which the moving member approaches the magnet; and a cushioning member mounted on a predetermined position to prevent the moving member from coming in contact with the magnet, wherein a total spring constant obtained by a combination of the attraction force between the magnet and the moving member with, an elastic force of the elastic member is set to substantially zero within a predetermined range of displacement.

In a preferred embodiment of the present invention, the elastic member comprises a metal spring.

In a preferred embodiment of the present invention, the cushioning member comprises a rubber.

In accordance with another aspect of the present invention, a vibration damping apparatus using a magnetic circuit is provided. The vibration damping apparatus using the magnetic circuit comprises: a moving member placed to move relatively away from and close to a magnet and made of a magnetic material which generates an attraction force between the moving member and the magnet; an elastic member urging the moving member in a direction in which the moving member approaches the magnet; a cushioning member mounted on a predetermined position to prevent the moving member from coming in contact with the magnet; and an operating member connected to the moving member and placed so that the magnet is positioned around the operating member, moving in a direction in which it traverses a magnetic flux generated in a space in the magnet with the approaching and leaving movement of the moving member, and made of a conductive material which generates a damping force by an electromagnetic inductive action, wherein a total spring constant obtained by a combination of the attraction force between the magnet and the moving member with an elastic force of the elastic member is set to substantially zero within a predetermined range of displacement.

In a preferred embodiment of the present invention, the elastic member comprises a metal spring.

In a preferred embodiment of the present invention, the cushioning member comprises a rubber.

DETAILED DESCRIPTION OF THE PREFERRED EMBODIMENTS

Figure 1:
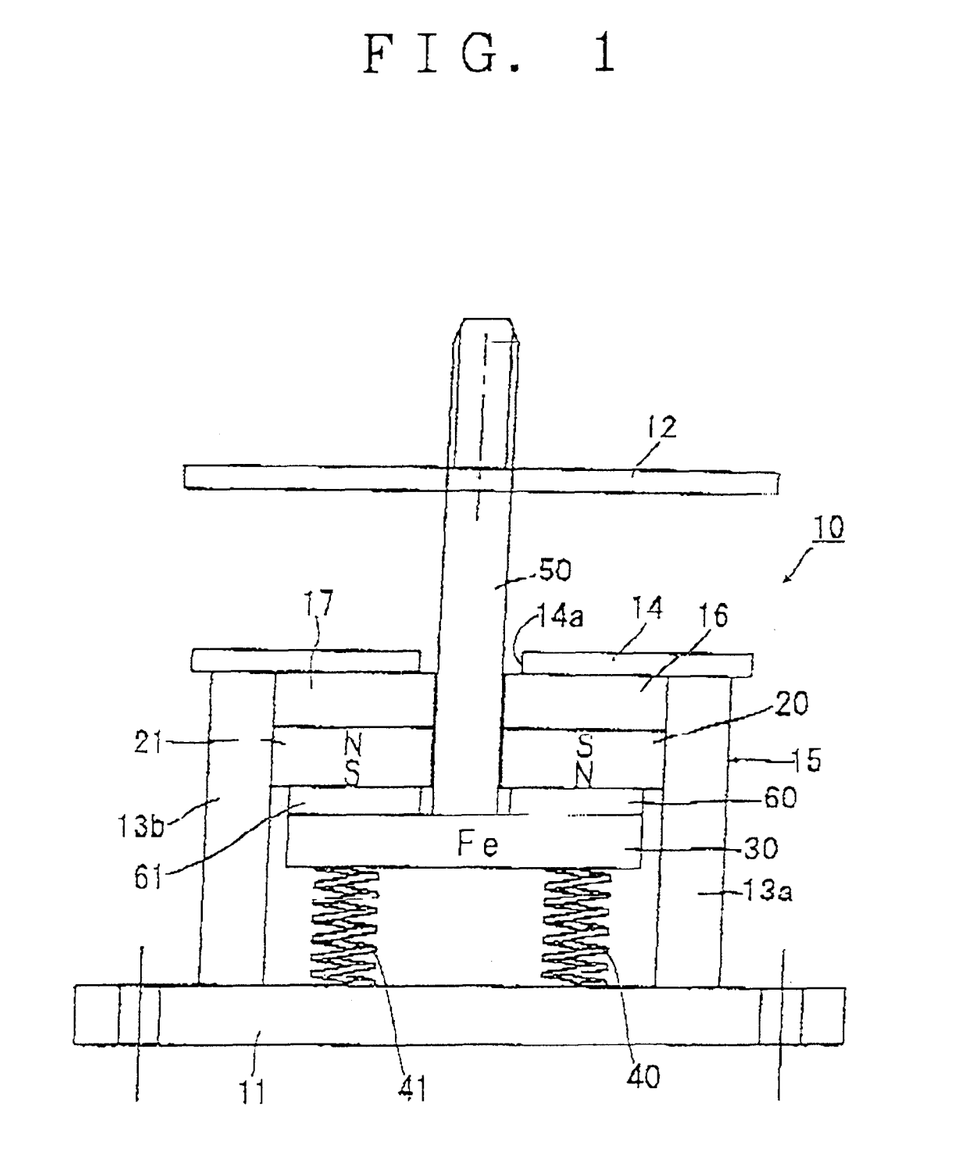
FIG. 1 is a schematic sectional view showing a vibration damping apparatus according to a first embodiment of the present invention.
Figure 2:
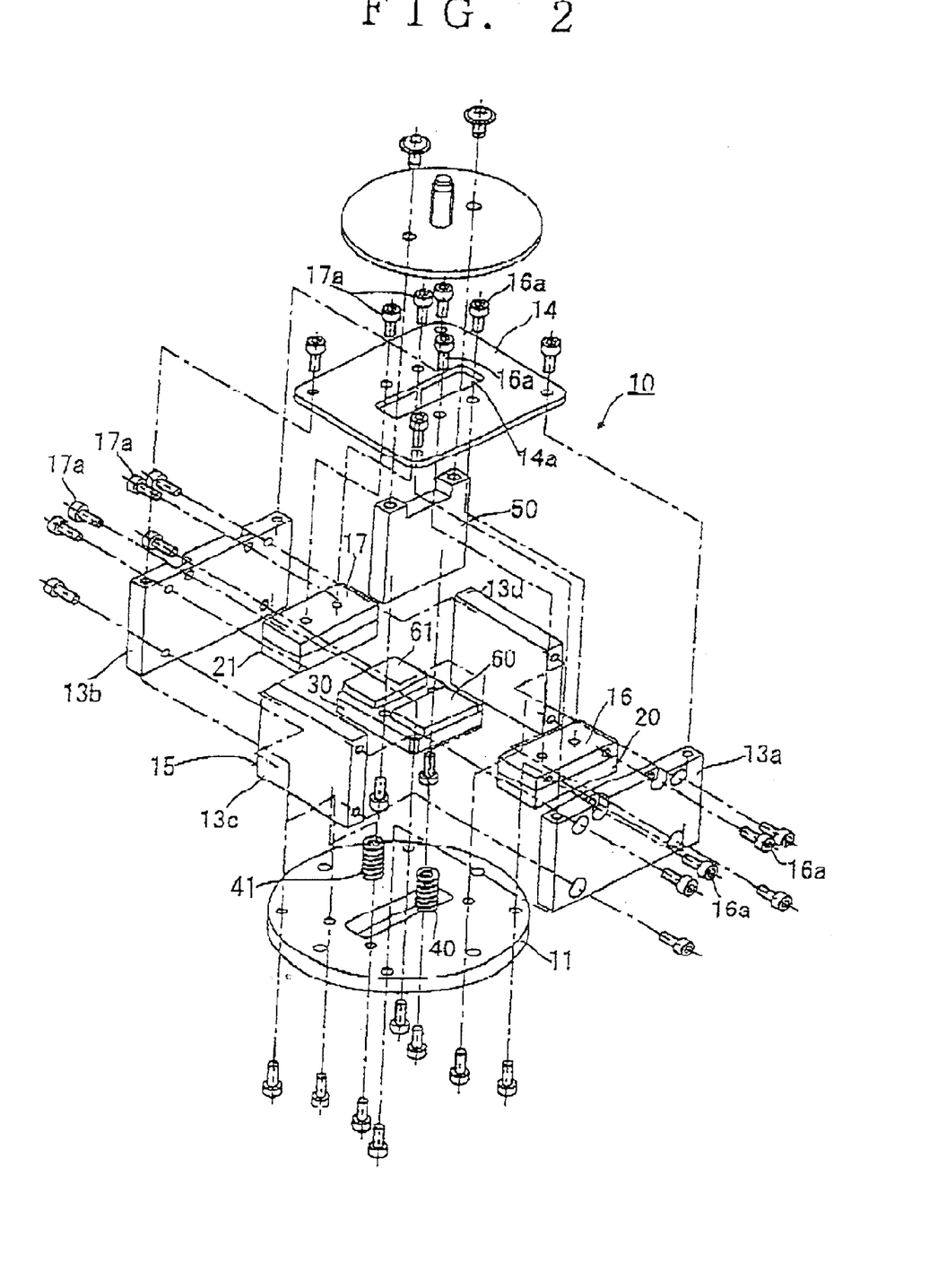
FIG. 2 is an exploded perspective view of the vibration damping apparatus according to the first embodiment.
Figure 3:
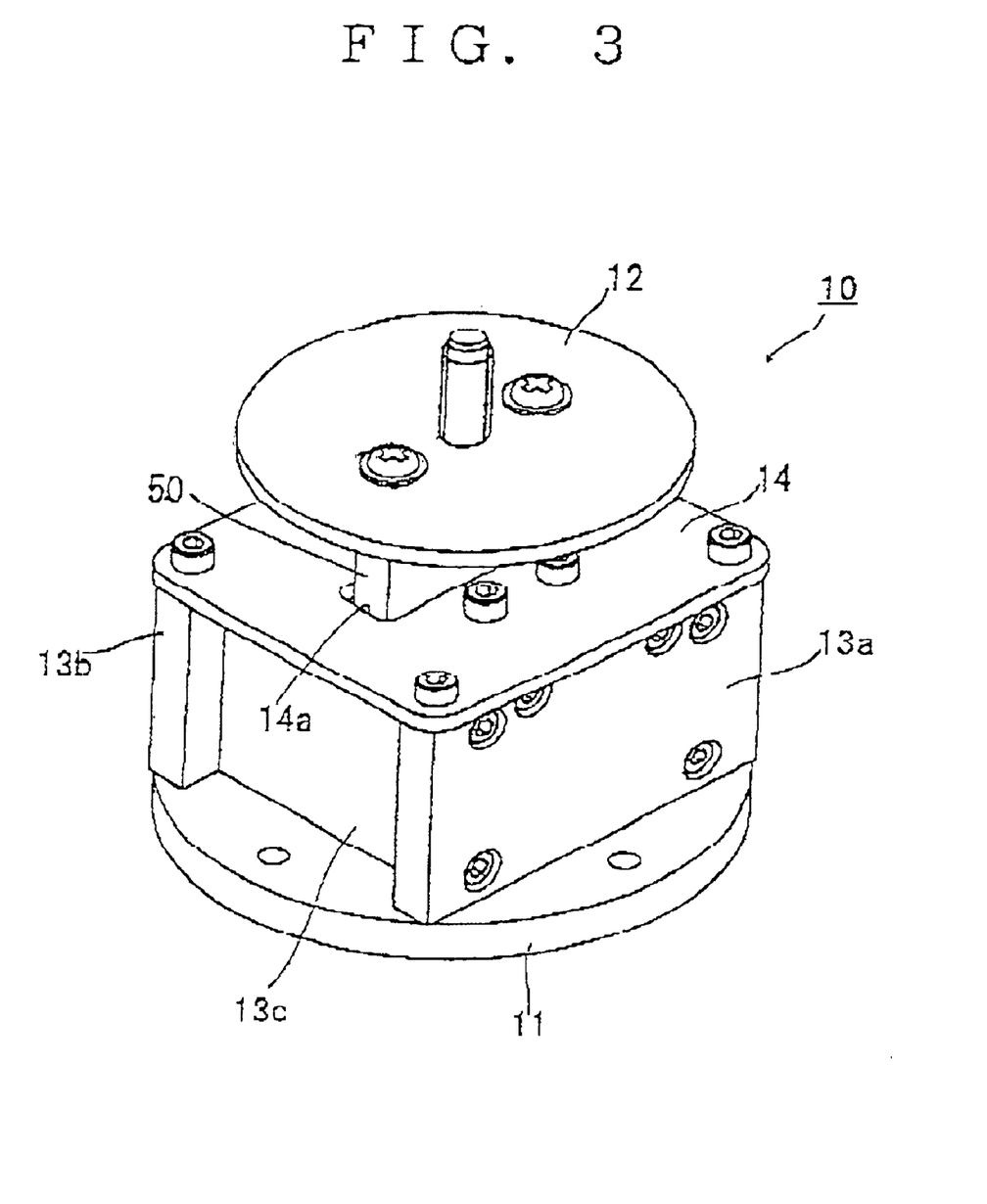
FIG. 3 is an outside perspective view of the vibration damping apparatus according to the first embodiment.

Preferred embodiments of the present invention will be explained below in more detail with reference to the drawings. FIG. 1 to FIG. 3 each show a vibration damping apparatus according to a first embodiment of the present invention, FIG. 1 is a schematic sectional view, FIG. 2 is an exploded perspective view, and FIG. 3 is an outside view, This vibration damping apparatus 10 includes a base plate 11 and an upper plate 12. In practice, these plates 11 and 12 have various shapes depending on the shapes of frames to which these plates are attached. For example, the base plate 11 is connected to a vehicle body frame or the like, and the upper plate 12 is connected to a frame for supporting a load mass or the like.

An almost box-shaped casing 15 comprising four side plates 13a to 13d and a top plate 14 is fixedly mounted on the base plate 11. In the casing 15, metal springs (coil springs) 40 and 41, which are elastic members, are attached to the upper face of the base plate 11 with a predetermined space therebetween so that they can exhibit elastic force in a vertical direction.

Magnets 20 and 21 are fixed to the casing 15. In this embodiment, the magnets 20 and 21 are fixed with their respective magnetized faces placed vertically on the inner faces of a pair of side plates 13a and 13b which are opposite to each other in FIG. 1 and FIG. 2 by fixedly attaching yokes 16 and 17 to upper faces of the magnets 20 and 21, and connecting these yokes 16 and 17 to the side plates 13a and 13b and the top plate 14 with screws 16a and 17a.

Both the magnet 20 and 21 are permanent magnets. The magnets 20 and 21 are placed so that they can attract a moving member 30 which is placed between the metal springs 40 and 41 and the magnets 20 and 21. More specifically, when the moving member 30 is made of a ferromagnetic material, each magnetic pole of the magnets 20 and 21 facing the moving member 30 may be either of the N pole or the S pole, and when the moving member 30 comprises a permanent magnet, the magnets 20 and 21 and the moving member 30 are placed so that their magnetic poles facing each other are opposite. The space between the magnets 20 and 21 has a size enough to allow an operating member 50 which is connected to the moving member 30 to move vertically without touching the magnets 20 and 21 in FIG. 1.

The moving member 30 is positioned between the magnets 20 and 21 and the metal springs 40 and 41 as described above, and its lower face is always in touch with the metal springs 40 and 41. The moving member 30 needs to be made of a magnetic material so as to be attracted by the magnets 20 and 21. As the magnetic material, any ferromagnetic material such as iron (Fe) or ferrite, or a permanent magnet can be used. When the ferromagnetic material or the permanent magnet is used as the moving member 30, the magnetic poles of the magnets 20 and 21 are arranged as described about.

A lower end face of the plate-shaped operating member 50 is fixed by screws near the center of the upper face of the moving member 30. This operating member 50 protrudes upward through a through-hole 14a bored in the top plate 14 composing the casing 15 and is fixedly connected to the upper plate 12. As described above, the upper plate 12 is fixed to, for example, the frame for supporting a load mass, and the base plate 11 is fixed to, far example, the vehicle body frame. Hence, the moving member 30 is supported by the upper plate 12 via the operating member 50 and moved in a direction in which the moving member 30 approaches the magnets 20 and 21 by the metal springs 40 and 41. The magnets 20 and 21 are supported by the base plate 11 via the casing 15. Therefore, the moving member 30 relatively moves close to and away from the magnets 20 and 21 with vibration and the like.

In FIG. 1 to FIG. 3, the numerals 60 and 61 denote rubbers as cushioning members. When the moving member 30 relatively moves upward and approaches the magnets 20 and 21, the rubbers 60 and 61 prevent their contact, and further prevent their collision, thereby protecting the magnets 20 and 21. The rubbers 60 and 61 as cushioning members may function as described above. Specifically, the rubbers 60 and 61 have only to prevent further approach of the moving member 30 and the magnets 20 and 21, for example, by coming into contact with either of the moving member 30 or the magnets 20 and 21 before they adhere directly to each other, and therefore, their positions are not limited to any specific positions. In this embodiment, the rubbers 60 and 61 are fixedly stuck on the face of the moving member 30.

Figure 4:
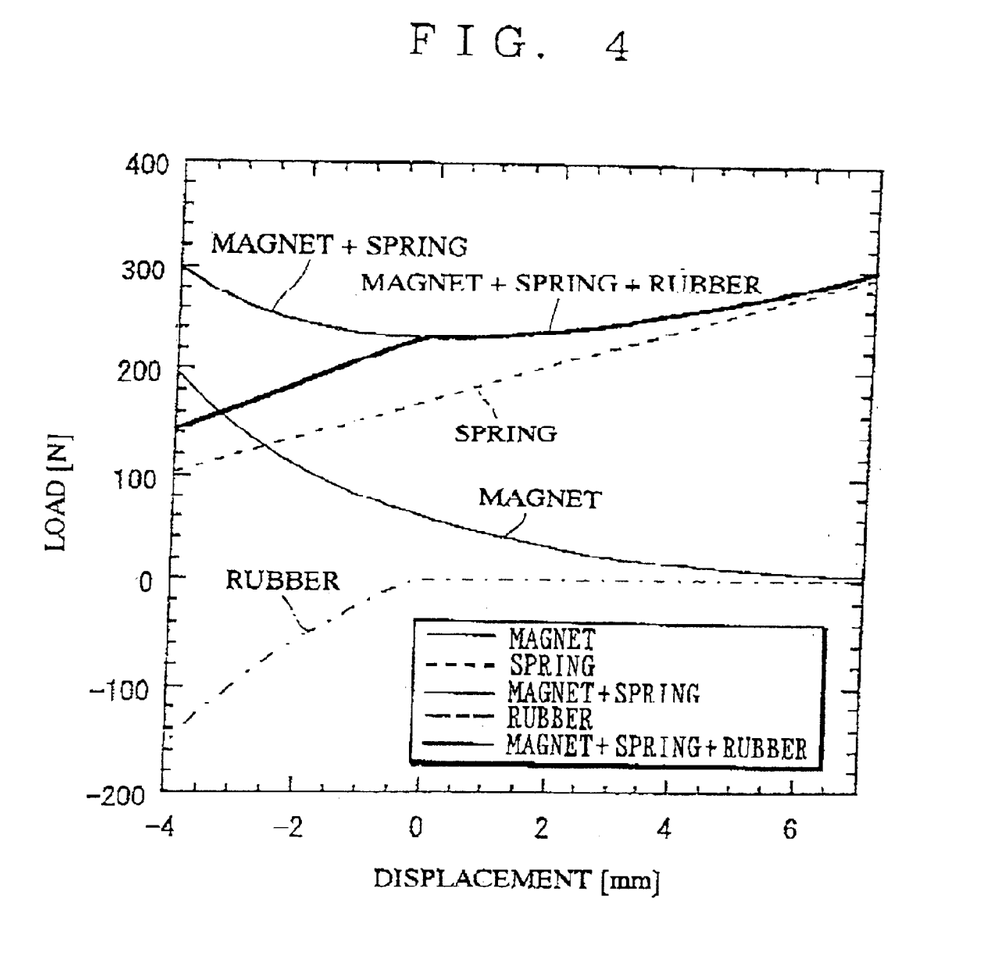
FIG. 4 is a diagram showing a load-displacement characteristic of the vibration damping apparatus according to the first embodiment.

According to this embodiment, a negative spring constant can be created by attraction force between the magnets 20 and 21 and the moving member 30, while the moving member 30 is moved toward the magnets 24 and 21 by the metal springs 40 and 41. Accordingly, a positive spring constant possessed by the metal springs 40 and 41 is combined with the negative spring constant created by the attraction force, and as a result, the total spring constant of the combination can be substantially near zero within a predetermined range of displacement. Namely, a characteristic that a load is partially steady in relation to a change in displacement can be obtained. FIG. 4 is a diagram showing a load-displacement characteristic of the vibration damping apparatus 10 according to the first embodiment for explaining this point.

In this experimentation, a load caused when the moving member 30 is relatively pushed down, that is, when the rubbers 60 and 61 are moved in a direction away from a position at which the rubbers 60 and 61 touch the magnets 20 and 21 and are compressed, is measured in relation to a displacement, while applying a predetermined load mass on the upper plate 12, in other words, a load which is a combination of the attraction force of the magnets 20 and 21 and the elastic force of the metal springs 40 and 41 is measured in relation to a displacement. Iron (Fe) is used as the moving member 30, and a copper plate is used as the operating member 50. In FIG. 4, a displacement of "0" mm indicates a position immediately after the rubbers 60 and 61 and the moving member 30 are separated from each other.

In FIG. 4, "magnet+spring+rubber" shown by a thick full line indicates the characteristic of the vibration damping apparatus 10 according to the first embodiment, "rubber" shown by a chain line indicates the characteristic of the rubbers 60 and 61 alone, "magnet+spring" shown by a medium-thick full line indicates the characteristic of a combination of the attraction force of the magnets 20 and 21 and the elastic force of the metal springs 40 and 41 in which the elastic force of the rubbers 60 and 61 as cushioning members is excepted, "spring" shown by a broken line indicates the characteristic of the metal springs 40 and 41 alone, and "magnet" shown by a fine full line indicates the characteristic of only the attraction force between the magnets 20 and 21 and the moving member 30.

As is obvious from FIG. 4, concerning the whole characteristic of the vibration damping apparatus 10 according to the first embodiment shown by the full line, since the elastic force of the rubbers 60 and 61 is combined with the attraction force between the magnets 20 and 21 and the moving member 30 and the elastic force of the metal springs 40 and 41 in the range of displacement up to 0 mm, a positive spring constant increasing diagonally to the right is shown. In the range of displacement from approximately 0 mm to approximately 3 mm, a spring constant shows substantially zero with a slight inclination. Thus, the spring constant changes nonlinearly. This is because the attraction force between the magnets 20 and 21 and the moving member 30 shown by the fine full line indicates a negative spring constant decreasing diagonally to the right, while the elastic force of the metal springs 40 and 41 indicates a linear positive spring constant increasing diagonally to the right as shown by the broken line, and consequently the total spring constant of the combination of the spring constants is substantially zero in a range where both the spring constants differ only in their plus and minus signs but have almost the same inclination.

The vibration damping apparatus 10 shown in FIG. 1 to FIG. 3 is of course an example. Although two magnets 20 and 21 are used in the aforesaid embodiment, the magnets can be arranged in any manner as long as a space through which the operating member 50 can pass is secured, that is, the magnets are placed around the operating member 50. For example, a cylinder-shaped or rectangular prism-shaped magnet can be used. In this case, the operating member 50 also has a cylinder shape or a rectangular prism shape so as to pass through the hollow portion of the cylinder-shaped or rectangular prism-shaped magnet.

As the result of the placement of the magnets 20 and 21 around the operating member 50, when the operating member 50 is made or a conductive material such as copper, aluminum, or the like, the operating member 50 moves through the space between the magnets 20 and 21 and traverses magnetic flux generated in the space, whereby induced electromotive force is caused by an electromagnetic inductive action. Accordingly, in the case of the aforesaid structure, the induced electromotive force caused by the electromagnetic inductive action functions as damping force, leading to a rise in damping property, FIG. 5 and FIG. 6 each show the vibration damping apparatus 10 according to a second embodiment of the present invention. It should be mentioned that members having the same numerals and symbols as the vibration damping apparatus 10 according to the first embodiment shown in FIG. 1 to FIG. 3 have the same functions.

Figure 5:
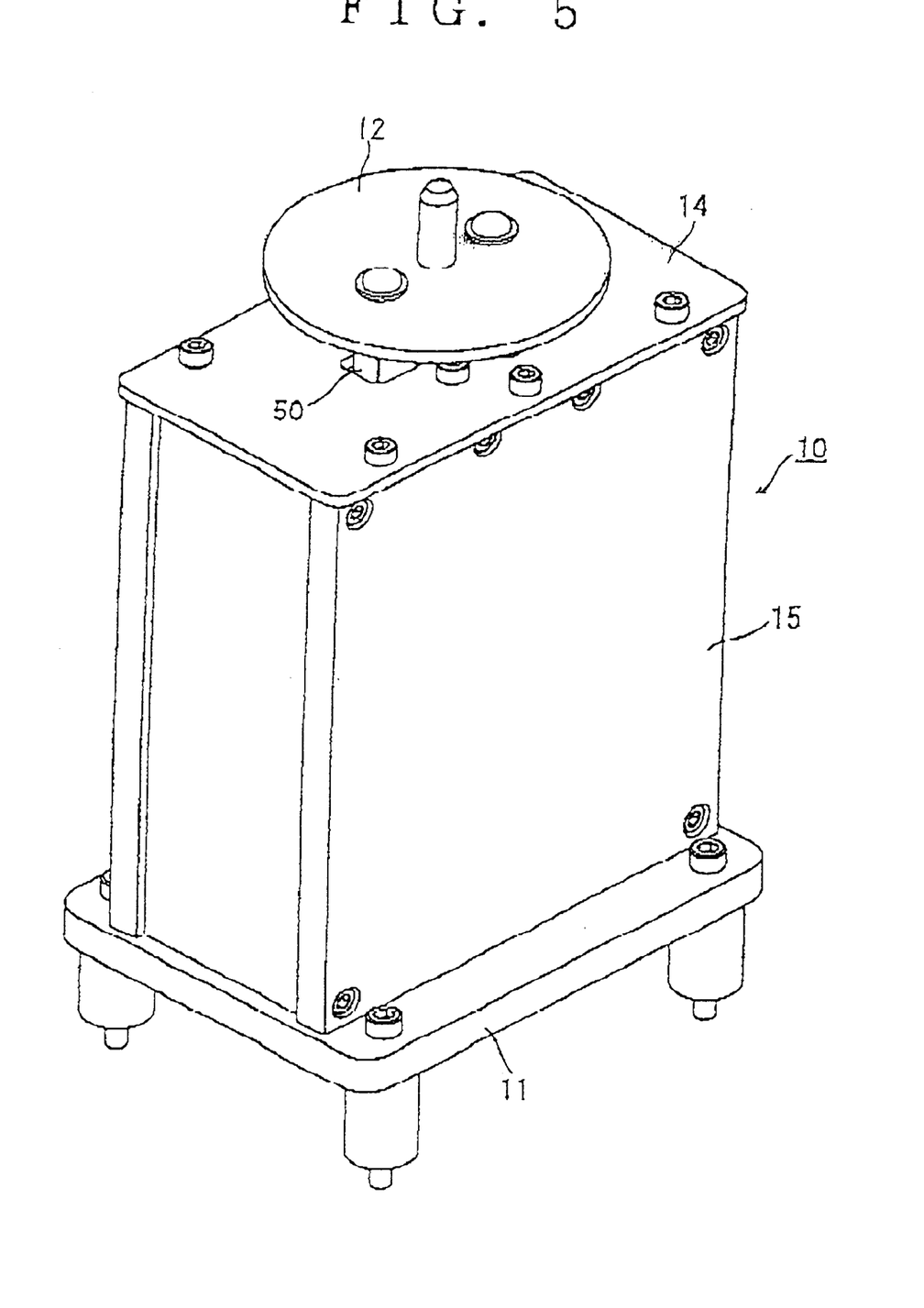
FIG. 5 is an outside perspective view showing a vibration damping apparatus according to a second embodiment of the present invention.
Figure 6:
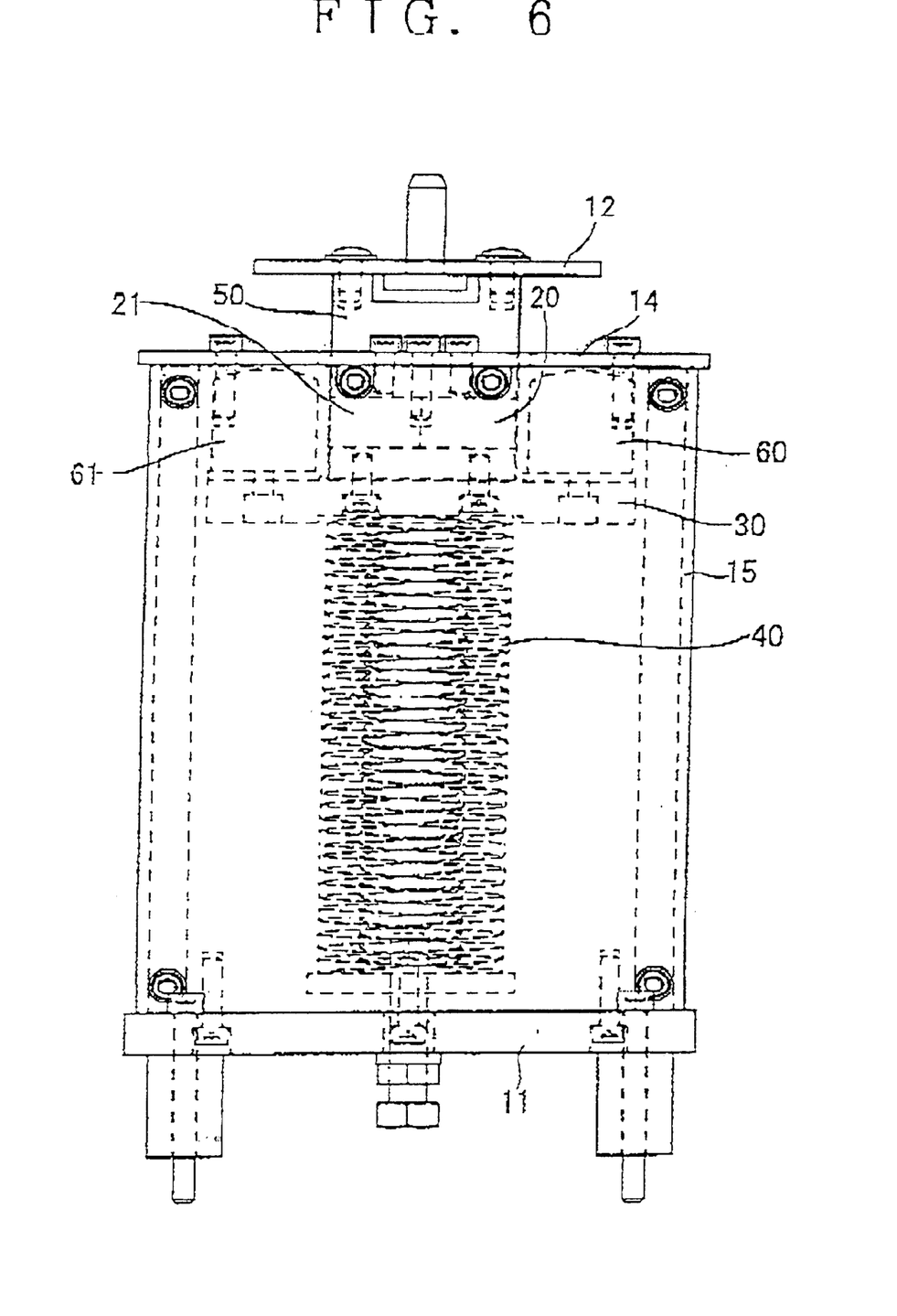
FIG. 6 is a sectional view of the vibration damping apparatus according to second embodiment.

Namely, the second embodiment is the same as the first embodiment in that the vibration damping apparatus 10 comprises an elastic member which is composed of the metal spring 40 supported on the base plate 11, the magnets 20 and 21 which are fixed to the casing 15 and placed with a predetermined space therebetween, the operating member 50 which is movable vertically relative to the magnets 20 and 21 through the space between the magnets 20 and 21, and the moving member 30 which is attached to the lower and of the operating member 50 between the magnets 20 and 21 and the metal spring 40 and moved by the metal spring 40 in a direction in which the moving member approaches the magnets 20 and 21.

However, the second embodiment is different from the first embodiment in the following point. The rubbers 60 and 61 as cushioning members attached to the moving member 30 are mounted to touch the lower faces of the magnets 20 and 21 in the first embodiment, but in the second embodiment, the moving member 30 has such a size that its outer peripheral edge is positioned outside the magnets 20 and 21, and the rubbers 60 and 61 are mounted on the outer peripheral edge of the moving member 30. Thereby, the upper faces of the rubbers 60 and 61 can touch the inner face of the top plate 14 of the casing 15 through a portion around the magnets 20 and 21.

As described above, the rubbers 60 and 61 as cushioning members have only to prevent the contact of the moving member 30 and the magnets 20 and 21 and further to prevent their collision to thereby protect the magnets 20 and 21, and thus their positions are not limited to any specific positions. The second embodiment shows one example of variations in respect of their positions. Incidentally, the vibration damping apparatus 10 according to the second embodiment has the same characteristic as the first embodiment shown in FIG. 4. Specifically, this vibration damping apparatus 10 also has a spring constant being substantially zero within a predetermined range of displacement.

Figure 7:
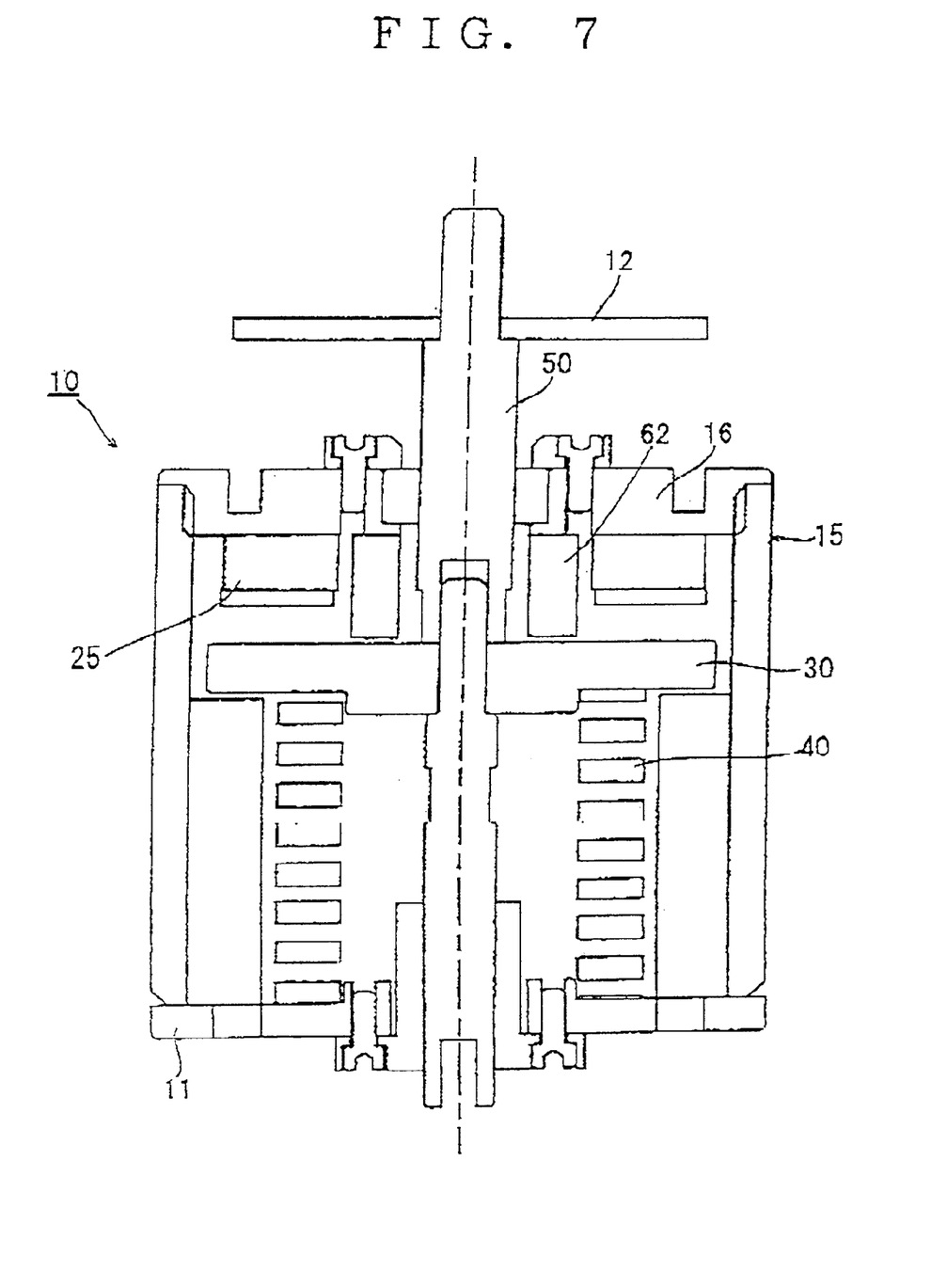
FIG. 7 is a schematic sectional view showing a vibration damping apparatus according to a third embodiment of the present invention.
Figure 8:
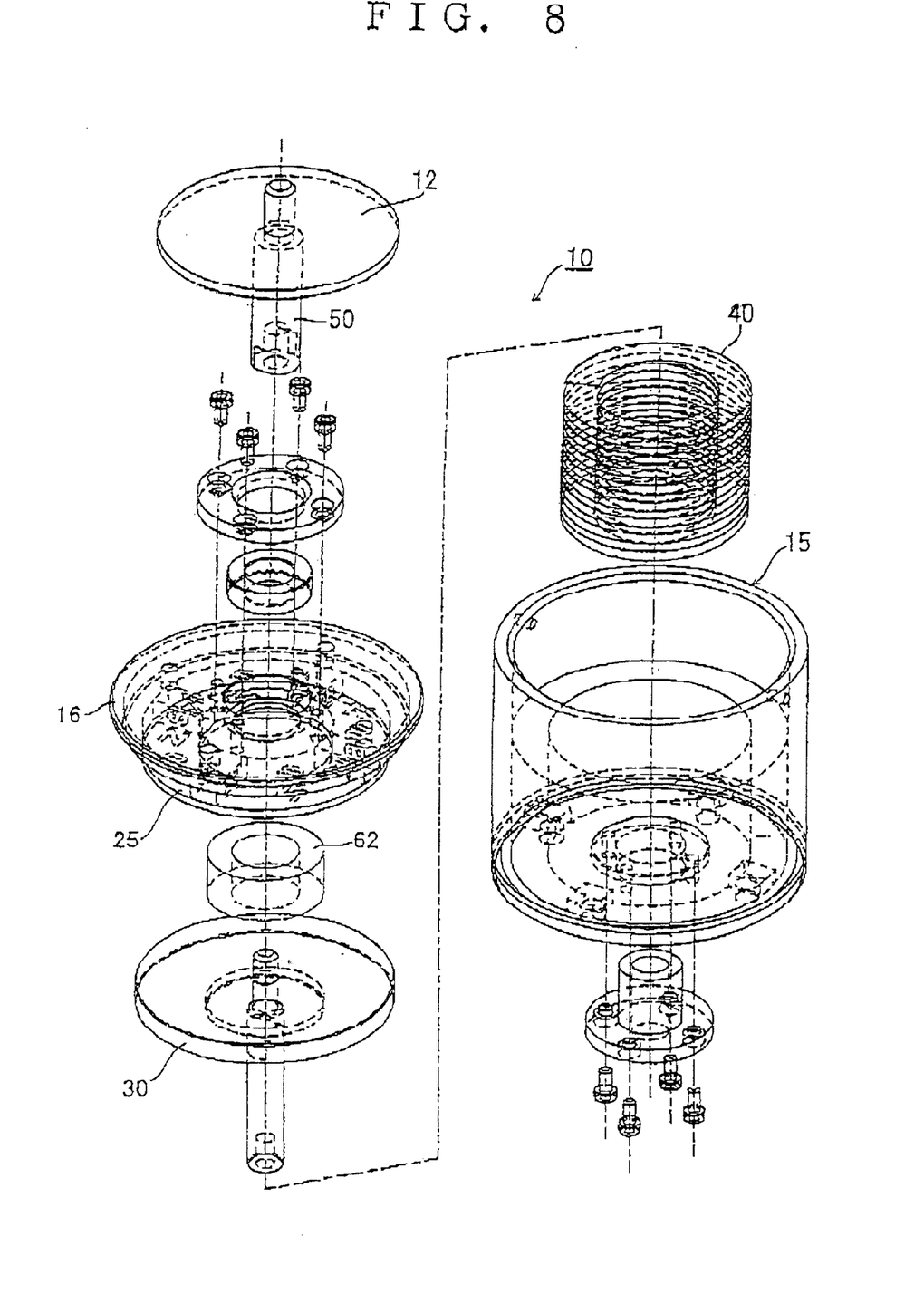
FIG. 8 is an exploded perspective view of the vibration damping apparatus according to the third embodiment.
Figure 9:
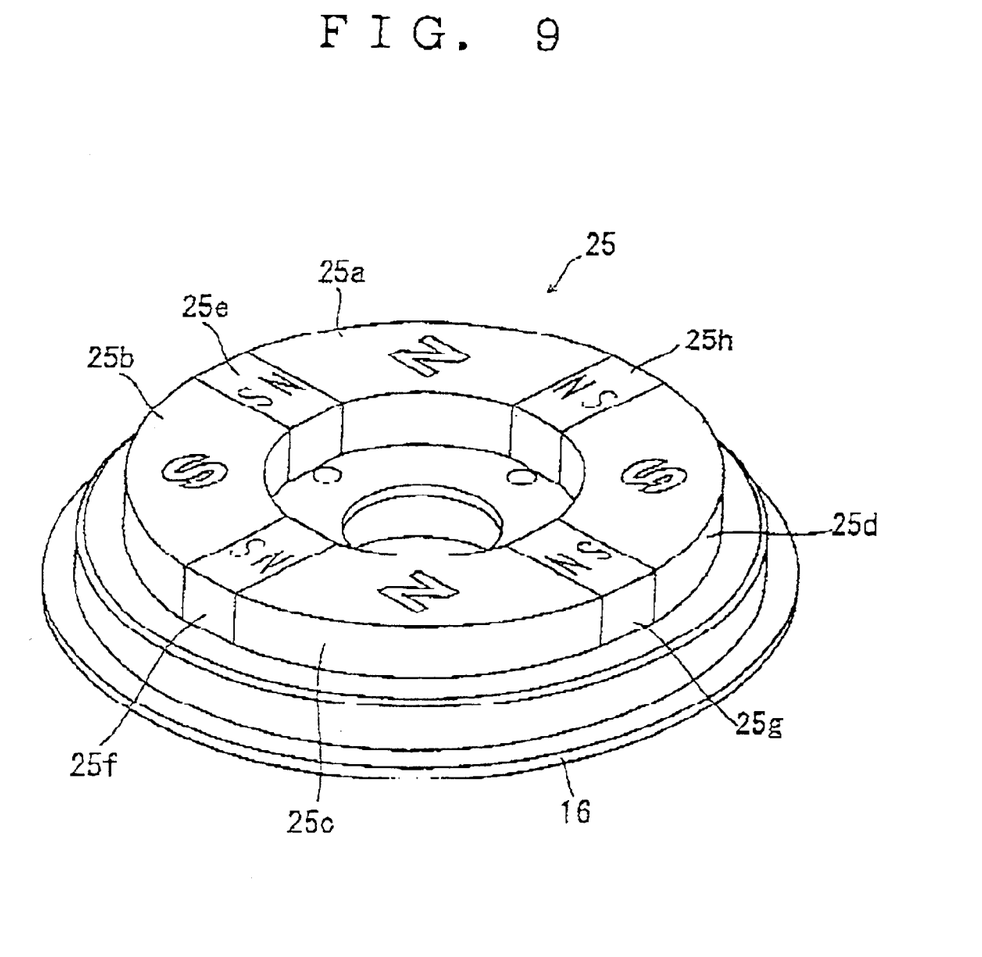
FIG. 9 is a perspective view for explaining the structure of a magnet used in the vibration damping apparatus according to the third embodiment.

FIG. 7 to FIG. 9 show the vibration damping apparatus 10 according to a third embodiment of the present invention. The third embodiment is different from the aforesaid embodiments in that the casing 15 has a cylindrical shape, the base plate 11, the upper plate 12, and the moving member 30 each have a disc shape, and the whole apparatus has a cylindrical shape, which indicates that vibration damping apparatus used in practice can be manufactured in various shapes from the limitation of installation space. As shown in FIG. 9, a ring-shaped magnet is used as a magnet 25, and a cylindrical rubber 62 as a cushioning member is mounted on the inner periphery of the magnet 25. This embodiment is different from the aforesaid embodiments also in that this rubber 62 is attached not to the moving member 30 but to the yoke 16 placed to shut the upper end opening of the casing 15. It is needless to say that the rubber 62 has a length capable of protruding downward from the inner periphery of the magnet 25 in FIG. 7 and prevents the moving member 30 from coming in contact with the magnets 20 and 21 even if the moving member 30 is moved upward by the metal spring 40 as an elastic member. This embodiment is the same as the aforesaid embodiments in this point.

Figure 10A:
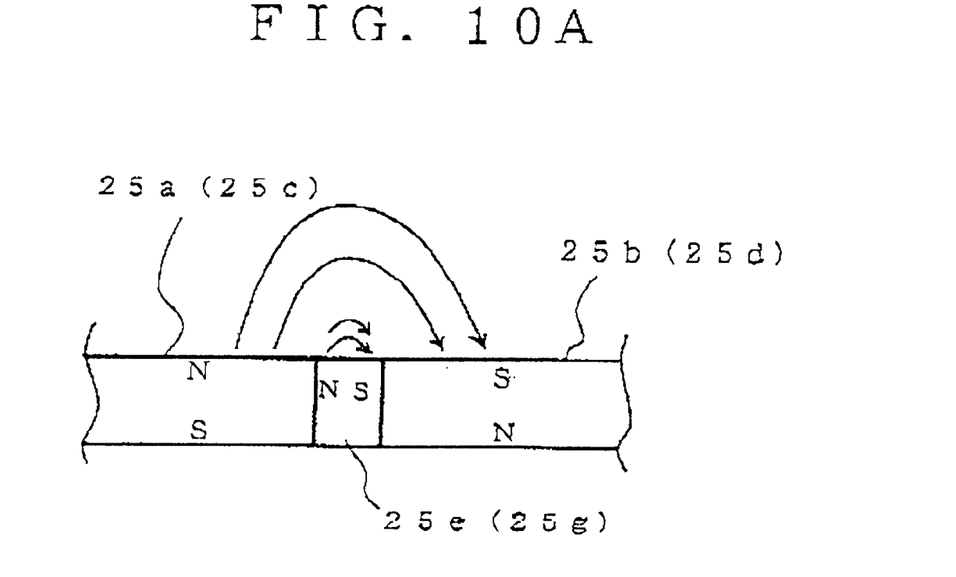
FIG. 10A and FIG. 10B are diagrams far explaining characteristics of the magnet shown in FIG. 9.
Figure 10B:
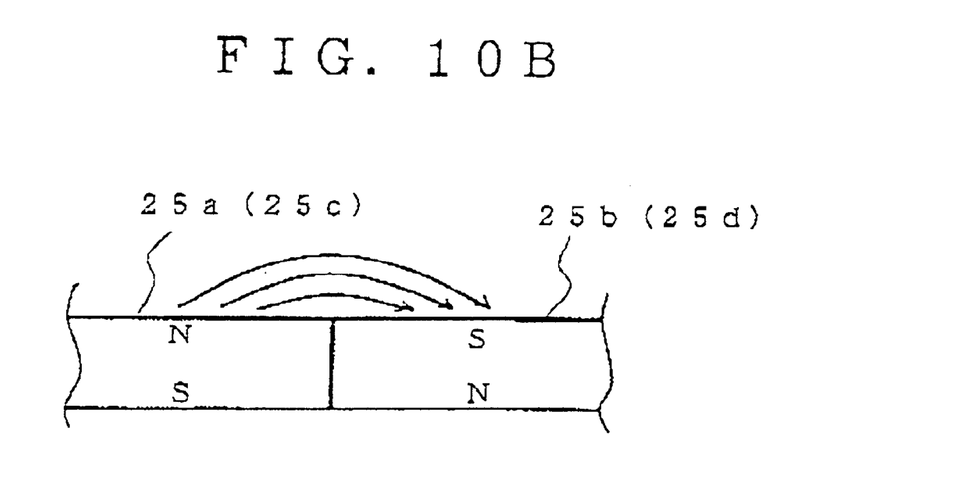

Specifically, the magnet 25 used in this embodiment is made of a multipolar magnet in which a plurality of magnetic poles are arranged in the form of a ring as shown in FIG. 9. Four large magnet pieces 25a to 25d each having an arc shape are arranged so that adjacent magnetic poles are different from each other, and small magnet pieces 25e to 25h are arranged so that their magnetic poles adjacent to respective large magnet pieces 25a to 25d are the same as magnetic poles of the large magnet pieces. As schematically shown in FIG. 10B, if a pole face of the ring-shaped magnet 25 is simply divided into four portions, magnetic flux flowing from one pole to the adjoining different pole increases, so that magnetic flux which functions as the attraction force for the moving member 30, that is, magnetic flux flying far to the moving member 30 decreases. However, as schematically shown in FIG. 10A, thanks to the aforesaid structure in this embodiment, magnetic flux, for example, from the N-pole of the large magnet piece 25a or 25c to the S pole of the adjacent large magnet piece 25b or 25d flows along the outside of magnetic flux generated between the N pole and the S pole of the small magnet piece 25*e* or 25*g* between the two large magnet pieces, so that magnetic fields of the large magnet pieces 25*a* to 25*d* can work effectively toward the moving member 30. Accordingly, when a multipolar magnet is used, it is desirable that a small magnet piece be sandwiched between large magnet pieces in the same manner as the magnet 25 in this embodiment.

A vibration damping apparatus using a magnetic circuit of the present invention is characterized by comprising a moving member placed to move relatively away from and close to a magnet and made of a magnetic material which generates attraction force between the moving member and the magnet, an elastic member urging the moving member in a direction in which the moving member approaches the magnet, and a cushioning member mounted on a predetermined position to prevent the moving member from coming in contact with the magnet, wherein a total spring constant obtained by a combination of the attraction force between the magnet and the moving member with an elastic force of the elastic member is set to substantially zero within a predetermined range of displacement. More specifically, by creating a negative spring constant using an attracting magnetic circuit and adding an elastic member having a positive spring constant with the same value as the negative spring constant, a total spring constant within a predetermined range of displacement can be set to substantially near zero by a very simple configuration.

Accordingly, the present invention provides a vibration damping apparatus which is simpler and less expensive to manufacture than conventional vibration damping apparatus using a magnetic circuit, and the use of this apparatus in a suspension unit, an engine mount, or the like can simplify the entire structure, reduce the size, and facilitate the maintenance of the suspension unit, the engine mount, or the like.

While preferred embodiments of the invention have bean described with a certain degree of particularity with reference to the drawings, obvious modifications and variations are possible in light of the above teachings. The scope of the invention is to be determined from the claims appended thereto.

What is claimed is:

1. A vibration damping apparatus using a magnetic circuit, comprising:
    a moving member placed to move relatively away from and close to a magnet and made of a magnetic material which generates an attraction force between said moving member and the magnet;
    an elastic member urging said moving member in a direction in which said moving member approaches the magnet; and
    a cushioning member mounted on a predetermined position to prevent said moving member from coming in contact with the magnet,
    wherein a total spring constant obtained by a combination of the attraction force between the magnet and said moving member with an elastic force of said elastic member is sot to substantially zero within a predetermined range of displacement.

2. A vibration damping apparatus using a magnetic circuit as set forth in claim 1,
    wherein said elastic member comprises a metal spring.

3. A vibration damping apparatus using a magnetic circuit as set forth in claim 1,
    wherein said cushioning member comprises a rubber.

4. A vibration damping apparatus using a magnetic circuit, comprising:
    a moving member placed to move relatively away from and close to a magnet and made of a magnetic material which generates an attraction force between said moving member and the magnet;
    an elastic member urging said moving member in a direction in which said moving member approaches the magnet;
    a cushioning member mounted on a predetermined position to prevent and moving member from coming in contact with the magnet; and
    an operating member connected to and moving member and placed so that the magnet is positioned around said operating member, moving in a direction in which it traverses a magnetic flux generated in a space in the magnet with the approaching and leaving movement of said moving member, and made of a conductive material which generates a damping force by an electromagnetic inductive action,
    wherein a total spring constant obtained by a combination of the attraction force between the magnet and said moving member with an elastic force of said elastic member is set to substantially zero within a predetermined range of displacement.

5. A vibration damping apparatus using a magnetic circuit as set forth in claim 4,
    wherein said elastic member comprises a metal spring.

6. A vibration damping apparatus using a magnetic circuit as set forth in claim 4,
    wherein said cushioning member comprises a rubber.

* * * * *